United States Patent
Dargontina et al.

(10) Patent No.: US 7,442,416 B2
(45) Date of Patent: Oct. 28, 2008

(54) METHOD USING ABRASION RESISTANT COATING FOR STACKS OF FIBER CEMENT SIDING

(75) Inventors: Jason E. Dargontina, St. Paul, MN (US); Donald W. Boespflug, Lino Lakes, MN (US)

(73) Assignee: Valspar Sourcing, Inc., Minneapolis, MN (US)

( * ) Notice: Subject to any disclaimer, the term of this patent is extended or adjusted under 35 U.S.C. 154(b) by 35 days.

(21) Appl. No.: 11/724,513

(22) Filed: Mar. 15, 2007

(65) Prior Publication Data

US 2007/0178294 A1 Aug. 2, 2007

Related U.S. Application Data

(63) Continuation of application No. 10/000,057, filed on Nov. 1, 2001, now Pat. No. 7,238,391.

(60) Provisional application No. 60/244,857, filed on Nov. 1, 2000.

(51) Int. Cl.
 *B05D 3/00* (2006.01)
(52) U.S. Cl. .................. 427/393.6; 427/385.5
(58) Field of Classification Search ............... 427/393.6, 427/385.5, 372.2, 384, 385.3; 428/423.1, 428/446
See application file for complete search history.

(56) References Cited

U.S. PATENT DOCUMENTS

| | | | |
|---|---|---|---|
| 3,412,054 | A | 11/1968 | Milligan et al. |
| 4,464,432 | A | 8/1984 | Dost et al. |
| 4,637,860 | A | 1/1987 | Harper et al. |

(Continued)

FOREIGN PATENT DOCUMENTS

DE 3306780 6/1986

(Continued)

OTHER PUBLICATIONS

Chemical Abstracts. Kubota Limited. Abstract No. 101:197127e. 1984, 101(22):307.

(Continued)

*Primary Examiner*—Thao T. Tran
(74) *Attorney, Agent, or Firm*—Mueting, Raasch & Gebhardt, P.A.

(57) ABSTRACT

This invention relates to a novel stack of siding, comprising: first and second coated siding pieces comprising an outer topcoat layer, an inner decorative coating layer and a fiberboard cement substrate layer; and a liner positioned between the first and second coated siding pieces. The siding, during normal transportation and installation, retains an acceptable appearance that is substantially free of viewable scratches or mars. In more preferred embodiments, the outer topcoat layer of the siding has a thickness of at least 8 microns and comprises a polyurethane dispersion. The present invention also provides novel methods of pre-finishing a fiberboard cement siding product, comprising the steps of: providing a fiberboard cement substrate layer; coating a first major surface of the fiberboard cement substrate with a decorative coating; coating the exposed surface of the decorative coating with a topcoat layer; and curing the topcoat layer to provide an abrasion resistant siding. More preferably, the curing step comprises a process that does not require heating the siding to a board surface temperature in excess of 100° C.

17 Claims, 3 Drawing Sheets

U.S. PATENT DOCUMENTS

| | | | |
|---|---|---|---|
| 4,644,030 | A | 2/1987 | Loewrigkeit et al. |
| 4,983,662 | A | 1/1991 | Overbeek et al. |
| 5,147,925 | A | 9/1992 | Pears et al. |
| 5,342,658 | A | 8/1994 | Hong et al. |
| 5,344,873 | A | 9/1994 | Blum |
| 5,506,031 | A | 4/1996 | Spain et al. |
| 5,541,251 | A | 7/1996 | Bontinck et al. |
| 5,571,861 | A | 11/1996 | Klein et al. |
| 5,637,639 | A | 6/1997 | Duan et al. |
| 5,710,209 | A | 1/1998 | Blum et al. |
| 5,854,332 | A | 12/1998 | Swarup et al. |
| 5,872,182 | A | 2/1999 | Duan et al. |
| 5,928,778 | A | 7/1999 | Takahashi et al. |
| 6,031,041 | A | 2/2000 | Chung et al. |
| 6,045,871 | A | 4/2000 | Matt et al. |
| 6,063,861 | A | 5/2000 | Irle et al. |
| 6,103,352 | A | 8/2000 | Takahashi |
| 6,136,383 | A | 10/2000 | Schwartz et al. |
| 6,395,827 | B1 | 5/2002 | Pears et al. |
| 6,413,623 | B2 | 7/2002 | Lewis et al. |
| 6,475,562 | B1 | 11/2002 | Vogt et al. |
| 6,709,806 | B2 | 3/2004 | Hotta et al. |
| 6,767,587 | B1 | 7/2004 | Brown |
| 6,852,399 | B2 | 2/2005 | Takahashi et al. |
| 2001/0014390 | A1 | 8/2001 | Lewis et al. |

FOREIGN PATENT DOCUMENTS

| | | |
|---|---|---|
| JP | 59097586 | 5/1984 |
| JP | 61 027355 | 6/1986 |
| JP | 04 063037 | 10/1992 |
| JP | 07-324432 | 12/1995 |
| JP | 10 036617 | 2/1998 |
| JP | 10-128902 | 5/1998 |
| JP | 29 63873 | 10/1999 |
| JP | 2000 044867 | 2/2000 |
| JP | 2000 061392 | 2/2000 |
| JP | 2000 086968 | 3/2000 |
| WO | WO 98/38249 | 9/1998 |
| WO | WO 00/24837 | 5/2000 |

OTHER PUBLICATIONS

Geurts, et al., "Self-crosslinkable Urethanes and Urethane/Acrylates," *Verfkroniek No. 1*, Jan. 1999; pp. 12-17.

"James Hardie Internal Lining" [online]. [retrieved on Feb. 20, 2000] <URL:http:www.jameshardie.com.au/international/Internal_Lining.asp> 1 pg.

Merriam-Webster Online Dictionary, "Coat," obtained from www.m-w.com and printed Jun. 23, 2005.

"Product Summary—Hardiglaze TM by James Hardie" [online]. [retrieved on Feb. 20, 2000] Retrieved from the Internet: <URL:http://www.ralenti.com/products/har03> 1 pg.

Tennebroek, et al., "New Polymer Synthesis for (self) Crosslinkable Urethanes and Urethane Acrylics," 4th Nürnberg Congress: International Centre for Coatings Technology, Paper 17 by Tennebroek, Geurts, Overbeek and Harmsen, 2000; 19 pgs.

International Search Report for PCT/US01/45155, International filing date Jan. 11, 2001 (4 pgs).

METHOD USING ABRASION RESISTANT COATING FOR STACKS OF FIBER CEMENT SIDING

This application is a continuation of application Ser. No. 10/000,057, filed Nov. 1, 2001 now U.S. Pat. No. 7,238,391, which claims the benefit of U.S. Provisional Application Ser. No. 60/244,857, filed Nov. 1, 2000, which are all incorporated herein by reference in their entirety.

BACKGROUND

Fiber cement composite siding is a relatively new and exciting building material that was recently introduced to the United States marketplace. Siding made from fiber cement composite comprises a substrate made up of wood pulp, silica and cement. One big advantage of this type of siding is its great durability. Some manufacturers, in fact, warrantee this product's continued function for up to fifty years. In comparison to shorter-lifetime vinyl or wood siding products this is a great advantage. Traditionally, fiber cement siding is often pre-painted (or pre-finished) in a factory setting and delivered to the job site, for example, in stacks of 8 or 12-foot long sheets. The pre-painted sheets, which may be profiled to look like wood products, or scalloped or cut to resemble shingles, are ready for attachment to the building and yield a primed and/or painted appearance immediately upon being so attached.

Unfortunately, however, fiber cement siding is a much heavier and a much more abrasive substrate compared to wood or vinyl siding products. While builders and homeowners desire the beauty and convenience of pre-painted fiber cement boards, prefinished fiber cement siding products are often visually marred or damaged, either during transit of the siding to the job site or during installation. The damage is often caused as a result of the heavy and abrasive pre-finished boards being rubbed against each other. For example, during installation the quite abrasive bottom surface of one piece of siding is able to easily mar the painted surface of another sheet. This can occur when a sheet being installed on a wall is slid against a sheet that already has been attached to the wall. In another situation the heavy sheets may rub against each other when they are stacked or unstacked. It is quite common that some amount of sliding occurs during these operations. In some cases the siding is packed in a "face-to-face" manner, though this is not always the case when the siding profile does not lend itself to such stacking. Even in these cases the heavy fiber cement siding is prone to visually apparent damage when the sheets are stacked or un-stacked, etc. While not intending to be bound by theory, it is believed that small abrasive particles (e.g., particles that come from the siding) can get between the faces of adjacent sheets and act as abrasive grit against the pre-painted surface. In other cases, the faces of the siding are textured to resemble wood grain. This texture pattern is itself a somewhat rough surface and face-to-face rubbing of the siding might cause abrasion of the pre-painted surfaces. Liners have been used to separate and protect the sheets, however these liners often do not stay exactly between the sheets, thereby allowing an opportunity for the sheets to rub together and become damaged.

Clear coat systems have been used over wood or wood composite substrates.

These systems often are "bake finishes" that require heating to a board surface temperature above about 100° C., more typically above about 150° C. Unfortunately, fiber cement has very poor heat transfer characteristics compared to traditional wood or wood composite siding and would require long heat up and cooling times compared to traditional siding substrates. Many pre-finishing lines do not have the oven capacity required to economically process such baked finishes.

From the foregoing, it will be appreciated that what is needed in the art is a pre-finished fiberboard siding product that maintains its factory appearance during transit and normal handling. Such siding products and methods for preparing the same are disclosed and claimed herein.

SUMMARY

In one embodiment, this invention relates to a novel stack of siding, comprising: first and second coated siding pieces comprising an outer topcoat layer, an inner decorative coating layer and a fiberboard cement substrate layer; and a liner positioned between the first and second coated siding pieces. In preferred embodiments, the siding, during normal transportation and installation, retains an acceptable appearance that is substantially free of viewable scratches or mars. In more preferred embodiments, the fiberboard cement substrate layer comprises wood pulp, silica and cement and has a density of at least 1 g/cm$^3$. Also in more preferred embodiments, the outer topcoat layer of the siding has a thickness of at least 8 microns and comprises a coating selected from the group consisting of polyurethane dispersions, acrylic emulsions, waterborne multi-component urethanes, waterborne multi-component epoxies, UV cured acrylics, visible light cured acrylics, and acrylic waterborne fluoropolymers. In most preferred embodiments, the outer topcoat layer comprises a polyurethane dispersion, wherein the outer topcoat layer is cured at a board surface temperature less than 100° C.

The present invention also provides novel methods of pre-finishing a fiberboard cement siding product, comprising the steps of: providing a fiberboard cement substrate layer; coating a first major surface of the fiberboard cement substrate with a decorative coating; coating the exposed surface of the decorative coating with a topcoat layer; and curing the topcoat layer to provide an abrasion resistant siding. More preferably, the curing step comprises a process that does not require heating the siding to a board surface temperature in excess of 100° C.

DETAILED DESCRIPTION

Figure 1:
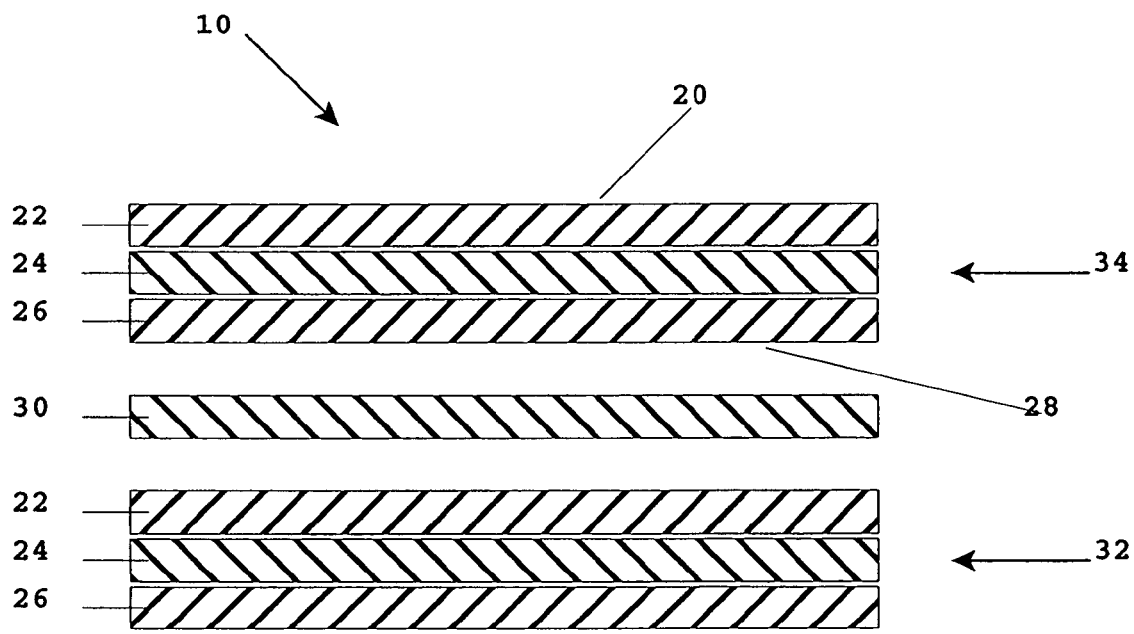
FIGS. 1-3 illustrate alternative exploded cross-sections of a partial stack of fiber cement siding of the present invention.

The present invention provides a mar and abrasion resistant pre-painted (or pre-finished) fiber cement siding products. Surprisingly, it has been discovered that by applying a clear topcoat finish (e.g., a low temperature cured topcoat) over a pre-painted or pre-finished fiber cement product, dramatically improves the mar and abrasion resistance of the product. The preferred low temperature cure topcoat finishes of the present invention provide a practical way for pre-finishers to further protect the painted surface on fiber cement substrates without the use of high temperature ovens.

By "mar and abrasion resistant" is meant that the overall product retains an acceptable appearance during transit and normal handling. The topcoat of the present invention may itself, in certain circumstances, become somewhat scratched or marred after transit and normal handling. Surprisingly, however, scratches and mars that are confined within this topcoat layer do not undesirably impact the visual appearance of the overall product.

As used herein, the terms "siding," "stacks of siding" or "siding products" are meant to include both siding products and trim products.

The current method of providing a pre-finished fiberboard cement product (i.e., where the product is finished prior to delivery and installation at the building site) requires elaborate packaging and handling methods to prevent damage of the pre-painted or pre-finished product. Unfortunately, these measures are only marginally effective in preventing damage and the product often must be repainted after installation. This invention preferably will protect the appearance of fiber cement products during the stacking, shipping, and installation processes. The result is less visual coating damage and, consequently, less need for touch-up repairs after installation.

Suitable fiber cement substrates for use in the present invention include composites of wood pulp (e.g., comprising cellulosic fibers), silica and cement (e.g., portland cement). A variety of such fiber cement products are now available on the market. For example, a premium fiber cement siding product is available from James Hardie Building Products Inc. These premium products (which include HARDIPLANK lap siding, HARDIPANEL vertical siding, HARDISHINGLE-SIDE, and HARDIEHOME siding) are said to offer the warmth of wood, and the durability of fiber-cement. These products offer a 50-year transferable warranty, and are said to resist moisture damage, be low maintenance, not crack, rot or delaminate, resist damage from extended exposure to humidity, rain, snow, salt air and termites, and be non-combustible. Other suitable fiber cement siding products include CEM-PLANK and CERTAINTEED.

Typical fiber cement substrates are quite heavy and have a density of between about 1 and 1.6 g/cm$^3$ or even higher.

Suitable fiber cement substrates for use in the present invention include unprimed fiber cement substrates that are decorated and top coated as described herein and commercially available pre-primed or pre-painted fiber cement substrates that are top coated as described herein.

The improved siding of the present invention comprises one or more layers of a decorative coating. For example, in one preferred embodiment the decorative coating comprises a primer layer and one or more colored layers. An optional sealer layer underneath the primer layer may also be utilized, if desired. The choice of particular sealer, primer and colored layer is not critical. However, the layers underneath the topcoat and the particular topcoat selected should be preferably selected such that there is adequate adhesion of the topcoat to the underlying layer(s).

Suitable optional sealer layers include acrylic latex materials. In general, the typical function of a sealer layer is to provide one or more feature such as efflorescence blocking, water resistance and/or block resistance. An example of a commercially available sealer is OLYMPIC FC sealer (available from PPG).

Suitable optional primer layers include acrylic latex or vinyl primers. The primer may comprise color pigments, if desired.

Suitable decorative coatings include acrylic latex paints and commercially available coatings such as VALPRO FC (available from The Valspar Corporation), OLYMPIC FC (available from PPG) and 1500 Series Cabot Factory Finish and C$^3$ Factory Finish (both available from Cabot Corporation). These coatings are in some respects similar to standard exterior house paints; however, they have been formulated to work on cement substrates and in a factory finish application.

It has been discovered that applying a low temperature cure topcoat (preferably having a dry thickness of, for example, as low as about 5 microns, preferably at least 7 microns, more preferably at least 8 microns, and most preferably at least 10 microns) to a painted or finished fiber cement substrate provides a protective (or in some instances sacrificial) layer that imparts a significant improvement in mar (e.g., scratch) and abrasion resistance to the overall siding. In preferred embodiment the topcoat comprises a low temperature cured waterborne finish.

Suitable topcoats include polyurethane dispersions (PUDs), acrylic emulsions, waterborne multi-component urethanes, waterborne multi-component epoxies, UV or visible light cured acrylics, acrylic waterborne fluoropolymers, etc. Solvent borne systems may also be used, though they are not preferred for environmental reasons.

The presently preferred topcoat for use in the present invention comprises a polyurethane dispersion. Suitable polyurethane dispersions for use in the present invention include those described, for example, in U.S. Pat. Nos. 3,412,054; 4,644,030; 4,983,662; 5,147,925; 5,541,251; 5,571,861; 5,637,639; 5,710,209; 5,854,332; 5,872,182; 6,031,041; and 6,063,861 and in WO 00/24837. Other suitable polyurethane dispersions for use in the present invention include those described, for example, in *Self-crosslinkable Urethanes and Urethane/Acrylates*, Verfkroniek Nummer 1 January 1999 and in *New Polymer Synthesis for (self) Crosslinkable Urethanes and Urethane Acrylics*, 4$^{th}$ Nurnberg Congress, Paper 17 by Tennebroek, Geurts, Overbeek and Harmsen.

Commercially available polyurethane dispersions that may be used in formulating topcoats of the present invention include, for example, EPS 4203 (available from Engineered Polymer Solutions, Inc.) and NEORZ R9637 (available from Zenaca). Commercially available acrylics that may be used in formulating topcoats of the present invention include, for example, EPS 2718 (available from Engineered Polymer Solutions, Inc.). Other suitable commercially available resins for use in preparing topcoats of the present invention include AZORES acrylic waterborne fluoropolymer (available from The Valspar Corporation).

Polyurethane dispersions generally comprise a polymer formed from a polyisocyanate, a polyol, and a carrier (e.g., water and/or other solvents). There is a large freedom of choice in selecting the particular polyisocyanate, polyol or carrier. Suitable polyisocyanates include aliphatic isocyanates and aromatic isocyanates. Aliphatic isocyanate based PUDs are presently preferred.

Examples of some suitable isocyanates for use in the present invention include hexamethylene diisocyanate (HDI), isophorone diisocyanate (IPDI), 4,4'-methylene-dicyclohexylisocyanate (H$_{12}$MDI), toluene isocyanate (TDI), 4,4'-methylene-diphenylisocyanate(MDI), etc.

Examples of some suitable polyols for use in the present invention include polyether polyols, polyester polyols, polyamide polyols, polycarbonate polyols, etc.

If desired the polyurethane dispersion or the topcoat formulation may comprise a dispersing compound (e.g., a hydroxy alkanoic acid) and/or a chain extender (e.g., a diamine). Suitable chain extenders include, for example, hydrazine, ethylene diamine, butane diamine, hexane diamine, isophorone diamine, etc.

The polyurethane dispersions of the present invention preferably have a number average molecular weight of at least 1,800, more preferably at least 5,000, and most preferably at least 9,000. For urethane/acrylates the Mn ranges specified above optimally apply to both the urethane polymer component and the acrylic polymer component. The polyurethane dispersions of the present invention preferably have an acid number of between 6.5 and 80, more preferably between 9 and 50, and most preferably between 10 and 30 (where acid number is expressed in mg KOH per gram of solid polymer).

As previously mentioned, the topcoats of the present invention are preferably hardened without the need to heat the substrate surface to a high temperature. Consequently, radiation hardened systems (e.g., UV or visible-light cured systems) may be used. Alternatively, multi-component systems (e.g., two-part systems) may be employed. Multi-component systems may be hardened, for example, by mixing the components prior to or during application to the substrate and allowing the mixed components to harden on the substrate. Other low temperature cured systems may be utilized.

The topcoat may be applied to the pre-painted or pre-finished substrate using any suitable application method. For example, the topcoat may be roll coated, sprayed, curtain coated, vacuum coated, brushed, or flood coated using an air knife system. Preferred application methods provide a uniform coating thickness and are cost efficient.

The topcoat layer preferably is clear or only lightly pigmented. Generally, the topcoats of the present invention have a PVC (pigment volume concentration) of less than 20 percent, more preferably less than 15 percent.

It has been found that the thickness of the topcoat layer can affect the performance of the present invention. For example, if the topcoat is too thin the siding may not achieve the desired amount of mar and abrasion resistance. If the topcoat is too thick the costs of the system will unnecessarily increase or the color of the decorative layer may be compromised (e.g., the product may appear hazy or cloudy). A suitable thickness for the topcoat layer is between 5 and 100 microns, preferably between 7 and 50 microns, more preferably between 8 and 30 microns, and most preferably between 10 and 25 microns.

The topcoat may be cured using any suitable process (e.g., two-part curing mechanism, radiation curing, air drying, heat curing, etc.). More preferably, the topcoat is cured without the need to heat the cement substrate to a high temperature. Although heat curing is within the scope of the present invention, it is somewhat less efficient for cement-based products given their low heat transfer characteristics. Consequently, preferred processes generally require board surface temperatures that do not exceed 100° C., and preferably temperatures of less than 100° C., more preferably less than 80° C., and most preferably less than 70° C.

The topcoat may further comprise abrasion resistance promoting adjuvants such as silica or aluminum oxide.

A presently preferred formula for a suitable topcoat of the present invention (Formula A) is made according to the following procedure. In a high-speed mixer is charged 594 parts EPS 4203 PUD (available from Engineered Polymer Systems, Inc.). To this is added AMP-95 (2 parts, 2-amino 2-methyl 1-propanol, available from Angus Chemical) with good agitation. Water (50 parts), NOPCOSPERSE 44 (20 parts, available from Henkel), TS-100 silica (63 parts, available from Degussa) and water (110 parts) are pre-mixed with a high-speed mixer and added to the aforementioned EPS 4230 and AMP-95 mixture. DOWANOL DPNB (15 parts, available from Dow) and water (15 parts) are pre-mixed and added to the above. To this is then added KATHON LX 1.5 PCT preservative (1 part, available from Rohm & Haas) and POLYPHASE AF-1 anti-microbial agent (3 parts, available from Troy Chemical). The total mixture is then mixed at high speed for ten minutes and held at a temperature of about 27° C. A grind test may be run, if desired. Typically, the formulation at this stage will have about a 6+ HEGMAN value. To the above is added 20 parts water and BYK-025 defoamer (1.2 parts, available from BYK).

An alternative preferred formula for a suitable topcoat of the present invention (Formula B) is made according to the following procedure. In a high-speed dispersion tank is charged 189.5 parts water. To this is added under agitation TAMOL 731 surfactant (20 parts, available from Rohm & Haas), AMP-95 (2 parts, 2-amino 2-methyl 1-propanol, available from Angus Chemical), DOWANOL DPNB co-solvent (23 parts, available from Dow Chemical), BYK-025 defoamer (1.2 parts available from BYK), KATHON LX 1.5% preservative (1 part, available from Rohm & Haas), BUSAN 1292 anti-microbial agent (2 parts, available from Buckman) and EPS 4203 PUD (420 parts, available from Engineered Polymer Systems, Inc.). To this is added TS-100 silica (50 parts, available from Degussa) slowly under high agitation. The mixture is dispersed for approximately 15 minutes to a 4 Hegman and held at 21 to 32° C. To this is added additional EPS 4203 PUD (173 parts) and water (1 part). Typically, the mixture will have a viscosity of about 17 to 20 seconds (using a Zahn #3 EZ Viscosity Cup (available from Paul N. Gardner Co.). If desired an optional thickening agent may be utilized to achieve this viscosity.

Stacks of the siding of the present invention are often assembled using a liner between adjacent sheets of the siding. Suitable liners include sheet and film materials that can help protect the siding from damage when adjacent sheets are rubbed together. The liners may, if desired, adhere lightly to the siding (thereby helping keep the liner against the major surface of the siding) or simply remain in place by friction.

Suitable liners include paper, plastic, foam, non-woven or fabric sheet or film materials. Preferred liners include foam sheets, e.g., polyethylene foam sheets having a thickness sufficient to cushion the sheets to thereby further protect the siding. An example of suitable such foam sheets include sheets having a thickness of between about 0.15 to 0.6 cm.

The stacks of siding may be assembled in a face-to-face pattern (i.e., pairs of siding are stacked with each pair having the decorative major surfaces adjacent each other) or in a face-to-back pattern (i.e., the stack comprises two or more pieces of siding with the siding stacked in one orientation).

FIG. 1 illustrates an exploded cross-section of a partial stack 10 of fiber cement siding of the present invention. As illustrated, two pieces of siding (34 and 32) are shown one on top of the other (in a face-to-back orientation), with a liner 30 interposed there between. It is understood that in normal use siding piece 34 would directly contact liner 30 which would directly contact siding piece 32. Siding pieces 34 and 32 each have a viewable surface 20 and an abrasive surface 28. The siding pieces 34 and 32 are illustrated having three basic layers (22, 24, 26). It is understood that additional layers or sub-layers may be added without departing from the scope or spirit of this invention. Layer 22 illustrates a protective topcoat layer. Preferably layer 22 comprises a clear layer having a thickness of between 10 and 20 microns. Layer 24 illustrates a decorative layer. Typically, this decorative layer will comprise a colored paint material. Layer 26 illustrates the fiberboard cement substrate. Layer 26 is illustrated with a major abrasive surface 28. If desired, stack 10 could be alternatively assembled in a face-to-face orientation (i.e., piece 34 could be flipped upside down and layer 22 of piece 34 could be adjacent liner 30).

Figure 2:
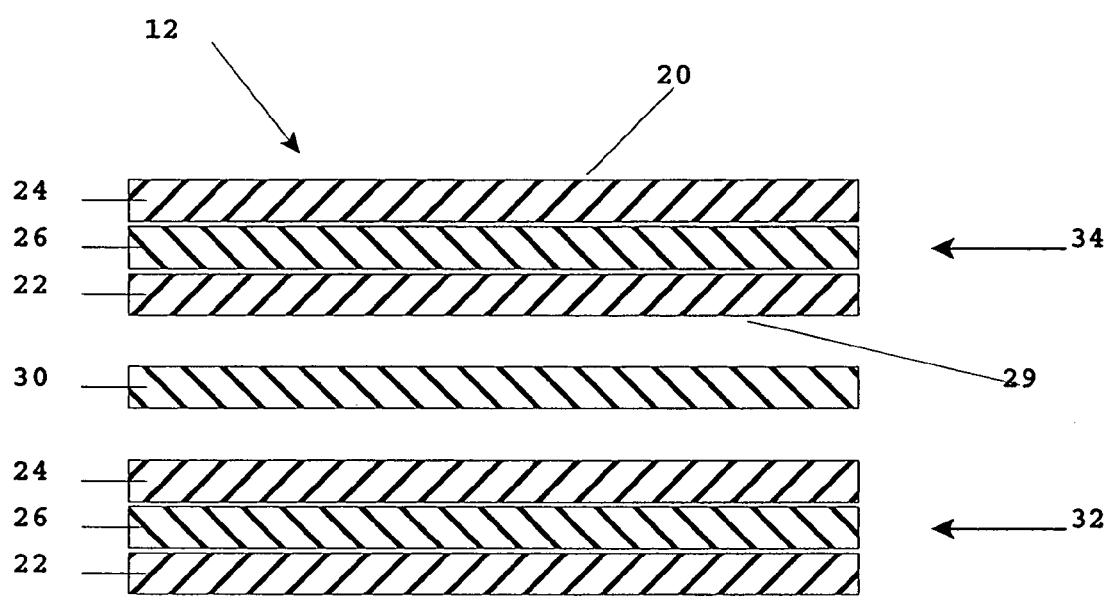

FIG. 2 illustrates an alternative exploded cross-section of a partial stack 12 of fiber cement siding of the present invention. As illustrated, two pieces of siding (34 and 32) are shown one on top of the other, with a liner 30 interposed there between. Siding pieces 34 and 32 each have a viewable surface 20 and an abrasive surface 28. The siding pieces 34 and 32 are illustrated having three basic layers (22, 24, 26). However, in this embodiment layer 22 illustrates a protective layer on the bottom of the siding piece. Preferably layer 22 comprises a layer having a thickness sufficient to smooth the normally rough and abrasive surface of the fiber cement, thereby providing a relatively smooth (or at least not as abrasive) surface 29. Layer 24 illustrates a decorative layer. Typically, this decorative layer will comprise a colored paint material. Layer 26 illustrates the fiberboard cement substrate.

Figure 3:
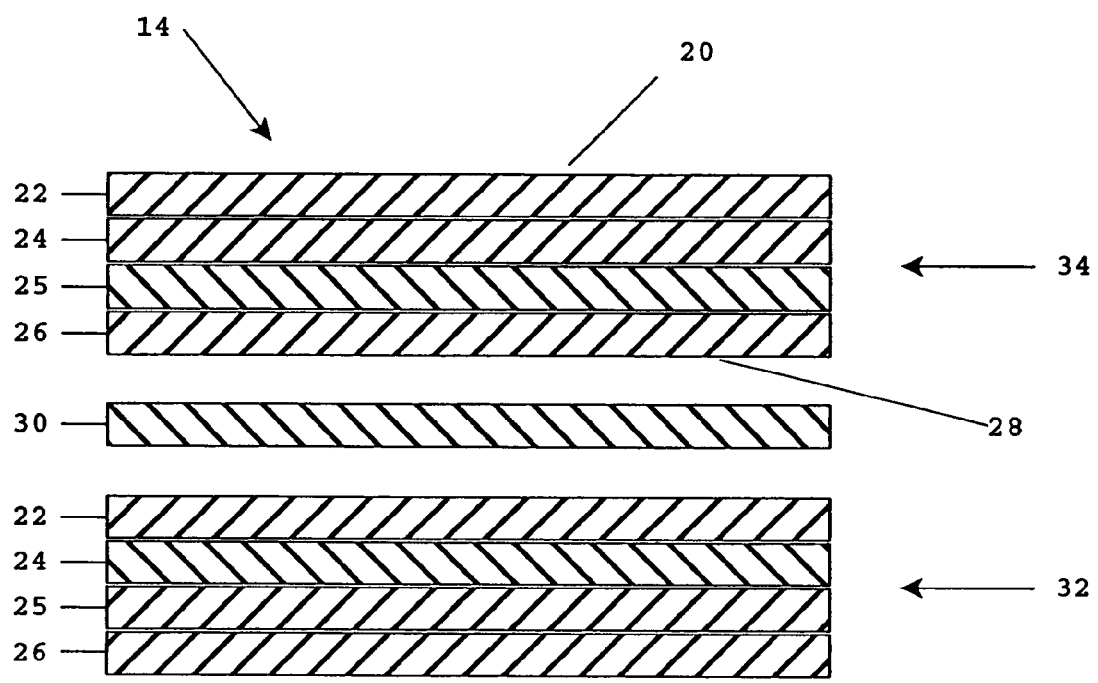

FIG. 3 illustrates an alternative exploded cross-section of a partial stack 14 of fiber cement siding of the present invention. This embodiment is quite similar to that shown in FIG. 1 and illustrates that the siding of the present invention may have more than one layer of a decorative coating. In this embodiment, layer 25 comprises a primer coating that is applied between the decorative layer 24 and the fiber cement substrate 26. If desired, stack 14 could be alternatively assembled in a face-to-face orientation (i.e., piece 34 could be flipped upside down and layer 22 of piece 34 could be adjacent liner 30).

The following examples are offered to aid in understanding of the present invention and are not to be construed as limiting the scope thereof. Unless otherwise indicated, all parts and percentages are by weight. The constructions cited were evaluated by tests as follows:

Visual Assessment of Mar and Abrasion Resistance:

Preferred topcoats provide mar and abrasion resistance to the overall fiber cement product. The mar and abrasion resistance may be visually assessed by performing a steel wool rub test. Preferred topcoats provide resistance even when rubbed, as described herein, for 20 double rubs using a back and forth motion and a medium coarse #2 steel wool pad (available from Rhodes American). The rubbed samples are then cleaned with water, allowed to dry, and visually assessed using a ten-point scale as described on the following table.

| Rating value | Appearance of the panel |
|---|---|
| 0 | Unacceptable appearance - severe loss of gloss and coating where rubbed. |
| 1-3 | Unacceptable appearance - severe loss of gloss and some loss of coating. |
| 4-6 | Acceptable appearance - slight change in appearance, e.g., some decrease in gloss and minor loss of coating. |
| 7-9 | Acceptable appearance - minor change in appearance, e.g., some minor decrease in gloss and minor loss of coating. |
| 10 | Acceptable appearance - negligible change in appearance |

An average rating for three tests is recorded.

EXAMPLES

Example 1

Low Temperature Cure PUD

The clear topcoat of Formula A was spray applied to 15 cm by 20 cm pieces of pre-finished fiber cement siding panel (Cedar Mill Select HARDIPLANK lap siding having VAL-PRO Factory Finish, available from James Hardie Building Products Inc.) at varying thickness. The topcoat coated pieces were then processed through a 150° C. oven to a board surface temperature of 60° C. (as measured using an infrared pyrometer).

After being conditioned to room temperature, the pieces were tested as described above for mar and abrasion resistance. The results for three samples at each thickness were:

| Thickness of dried topcoat (microns) | Assessment rating |
|---|---|
| 0 (control without topcoat) | 0 |
| 5 | 2 |
| 8 | 4 |
| 14 | 6 |
| 18 | 7 |
| 22 | 7 |
| 36 | 8 |

The above data illustrates that fiber cement products having a topcoat system of the present invention provide significant mar and abrasion resistance compared to fiber cement products that do not incorporate the improved topcoat system.

Example 2

Low Temperature Cure PUD

The clear topcoat of Formula B was spray applied to 15 cm by 20 cm pieces of pre-finished fiber cement siding panel (Cedar Mill Select HARDIPLANK lap siding having VAL-PRO Factory Finish, available from James Hardie Building Products Inc.) at varying thickness. The topcoat coated pieces were then processed through a 150° C. oven to a board surface temperature of 60° C. (as measured using an infrared pyrometer).

After being conditioned to room temperature, the pieces were tested as described above for mar and abrasion resistance. The results for three samples at each thickness were:

| Thickness of dried topcoat (microns) | Assessment rating |
|---|---|
| 0 (control without topcoat) | 0 |
| 5 | 2 |
| 8 | 2 |
| 14 | 5 |
| 18 | 7 |
| 22 | 7 |
| 36 | 9 |

The above data illustrates that fiber cement products having a topcoat system of the present invention provide significant mar and abrasion resistance compared to fiber cement products that do not incorporate the improved topcoat system.

Having thus described the preferred embodiments of the present invention, those of skill in the art will readily appreciate that the teachings found herein may be applied to yet other embodiments within the scope of the claims hereto attached. The complete disclosure of all patents, patent documents, and publications are incorporated herein by reference as if individually incorporated.

What is claimed is:

1. A method of making a fiberboard cement siding product prior to attaching the product to a building, the method comprising:

providing a fiberboard cement substrate;

coating a first major surface of the fiberboard cement substrate with a decorative coating;

coating the exposed surface of the decorative coating with a topcoat layer comprising a polyurethane dispersion; and curing the topcoat layer to provide a mar and abrasion resistant coated fiberboard cement siding product;

wherein curing comprises a thermal curing process that does not expose the siding to a board surface temperature in excess of 100° C.;

wherein the fiberboard cement substrate has a density of at least 1 g/cm$^3$ and comprises wood pulp, silica and cement, and the outer topcoat layer has a dry thickness of at least 8 microns.

2. The method of claim 1, wherein the topcoat layer has a dry thickness of at least 10 microns.

3. The method of claim 1, wherein the topcoat layer is cured at a board surface temperature of less than 80° C.

4. The method of claim 1, wherein the finished siding piece exhibits at most a slight change in appearance after 20 double rubs with medium coarse #2 steel wool pad.

5. The method of claim 1, wherein prior to coating a first major surface of the fiberboard cement substrate with a decorative coating, the first major surface is coated with a sealer and/or a primer.

6. The method of claim 1, wherein the topcoat layer further comprises an abrasion resistance promoting adjuvant.

7. The method of claim 1, further comprising stacking a first coated fiberboard cement siding product against a second coated fiberboard cement siding product.

8. A method of making a stack of fiberboard cement siding products, comprising:

preparing two or more coated fiberboard cement siding products, the method comprising:

providing a fiberboard cement substrate;

optionally coating a first major surface of the fiberboard cement substrate with one or more layers comprising a sealer, a primer, or both;

coating one or more layers of a decorative coating to the outermost surface of die optionally coated fiberboard cement substrate;

coating the exposed surface of the one or more layers of a decorative coating with a topcoat layer comprising a polyurethane dispersion;

curing the topcoat layer to provide a mar and abrasion resistant coated fiberboard cement siding product; wherein the curing step comprises a thermal curing process that does not expose the siding to a board surface temperature in excess of 100° C.; and stacking the two or more coated fiberboard cement siding products to form a stack;

wherein the fiberboard cement substrate has a density of at least 1 g/cm$^3$ and comprises wood pulp, silica and cement, and the outer topcoat layer has a dry thickness of between 8 and 100 microns.

9. The method of claim 8, wherein stacking further comprises placing a liner between the coated siding products.

10. The method of claim 9, wherein the liner comprises a foam sheet.

11. The method of claim 8, wherein the coated siding product exhibits at most a slight change in appearance after 20 double rubs with medium coarse #2 steel wool pad.

12. The method of claim 8, wherein the polyurethane dispersion is an aliphatic isocyanate-based polyurethane dispersion.

13. The method of claim 8, wherein the polyurethane dispersion comprises a polyurethane having a number average molecular weight of at least 1800.

14. The method of claim 8, wherein the polyurethane dispersion comprises a polyurethane having an acid number between 6.5 and 80 mg KOH per grain solid polymer.

15. The method of claim 8, wherein the topcoat layer has a pigment volume concentration of less than 20 percent.

16. The method of claim 8, wherein the topcoat layer has a dry thickness of at least 10 microns.

17. The method of claim 8, wherein the thermal curing process provides a board surface temperature of less than 80° C.

* * * * *

UNITED STATES PATENT AND TRADEMARK OFFICE
CERTIFICATE OF CORRECTION

| | | |
|---|---|---|
| PATENT NO. | : 7,442,416 B2 | Page 1 of 1 |
| APPLICATION NO. | : 11/724513 | |
| DATED | : October 28, 2008 | |
| INVENTOR(S) | : Dargontina et al. | |

It is certified that error appears in the above-identified patent and that said Letters Patent is hereby corrected as shown below:

Column 10, line 27, Claim 14, delete "grain" and insert --gram--.

Signed and Sealed this

Sixth Day of January, 2009

JON W. DUDAS
*Director of the United States Patent and Trademark Office*